United States Patent Office 2,829,153
Patented Apr. 1, 1958

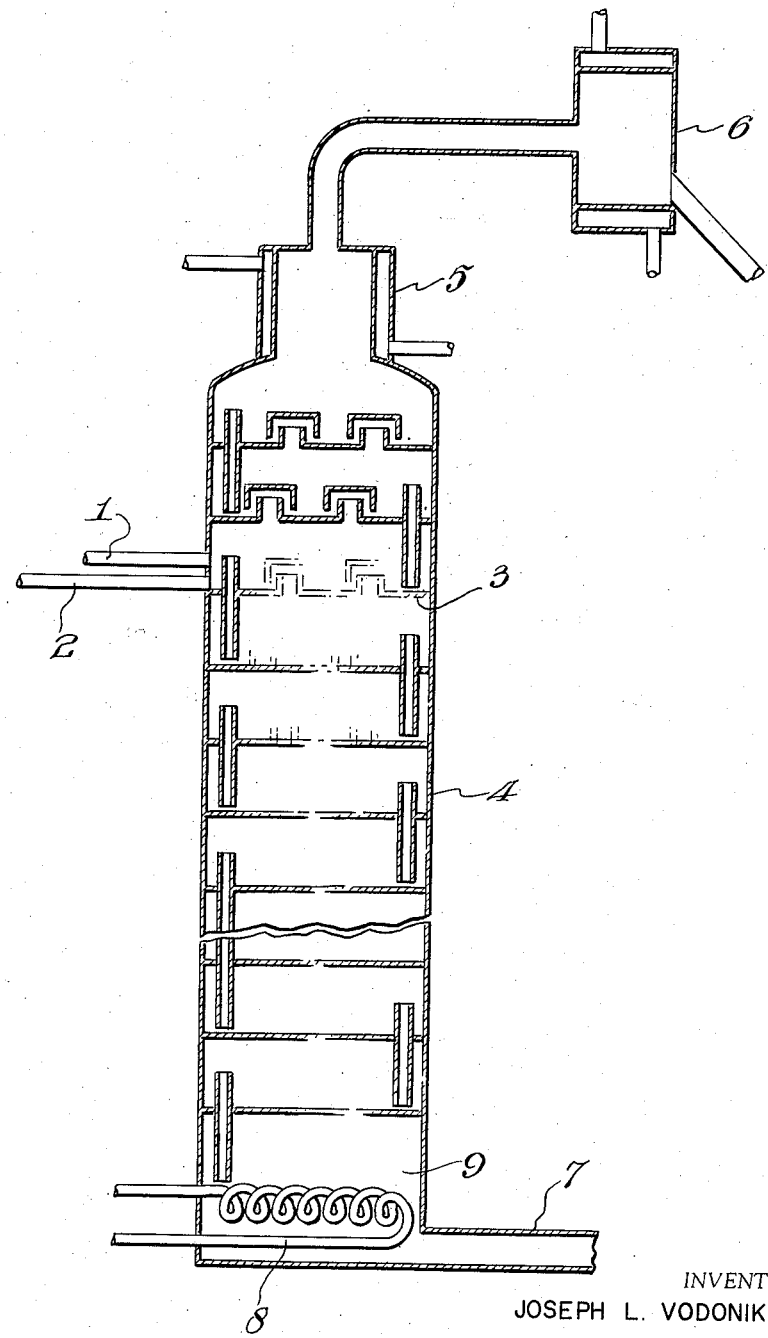

2,829,153

CONTINUOUS ESTER INTERCHANGE PROCESS

Joseph L. Vodonik, Rocky River, Ohio, assignor to E. I. du Pont de Nemours and Company, Wilmington, Del., a corporation of Delaware Application March 4, 1957, Serial No. 644,193

6 Claims. (Cl. 260—470)

This invention relates to the alcoholysis of esters. More particularly, it relates to the continuous reaction of a dihydric alcohol with an ester of a lower-boiling alcohol and a dicarboxylic acid, such as the reaction of ethylene glycol with dimethyl terephthalate to produce glycol esters with an essentially quantitative elimination of methyl alcohol and is a continuation-in-part of my application Serial No. 322,693, filed November 26, 1952, now abandoned.

Alcoholysis of dimethyl terephthalate with ethylene glycol can be achieved at elevated temperatures with the elimination of methyl alcohol by the batch process. However, prior to the advent of the present invention no practical commercial method was known for the continuous reaction of dimethyl terephthalate with ethylene glycol so as to eliminate methyl alcohol substantially quantitatively. This circumstance had arisen because the equilibrium conditions for the reaction:

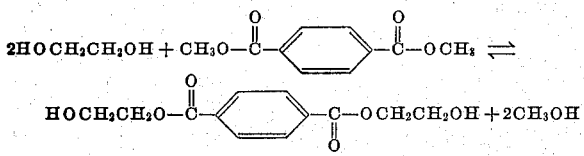

were unfavorable under the conditions normally employed in continuous reactors. Without removal of the products of the reaction, the equilibrium conversion for this reaction is low (about 20% at 175° C.). It was found that the equilibrium was shifted to the right by employing higher ratios of ethylene glycol to dimethyl terephthalate and that the rate of reaction was markedly increased at higher temperatures. Unfortunately, however, advantage of both these factors could not be taken simultaneously, because the boiling point of the system fell rapidly as the glycol to dimethyl terephthalate ratio was increased up to the level of 3:1. Above this ratio the boiling point of the system remained essentially level but it was not much higher than ethylene glycol itself and was still below that of dimethyl terephthalate.

It might be expected in the reaction described above where the boiling points of the respective materials are as follows:

Methyl alcohol_____ 64.5° C.
Ethylene glycol_____ 197° C.
Dimethyl terephthalate_____ 282° C.
Bis-β-hydroxyethyl terephthalate_____ 320° C. (approx.).

that a reaction at a temperature slightly above the boiling point of ethylene glycol would quickly bring about the elimination of methyl alcohol by volatilization. This is true in the early stages of the reaction where concentration of the methyl alcohol in the liquid phase is quickly reduced by volatilization to a level below the equilibrium concentration of the reaction so that the controlling factor is the actual rate of reaction of the ethylene glycol with the dimethyl terephthalate. However, in the later stages of the reaction (after 50 to 75% completion), where the equilibrium concentration of methyl alcohol is relatively small, the rate of reaction of ethylene glycol with dimethyl terephthalate is faster than the rate at which the methyl alcohol is removed from the liquid phase through volatilization. Hence, the rate of removal of the methyl alcohol at this stage of the reaction has become the controlling factor. At still higher conversions (95% and above) the methyl alcohol content in the liquid phase is not likely to be reduced below the equilibrium concentration produced by the reaction, and, hence, the reaction is effectively prevented from continuing to the desired completion.

It is apparent, therefore, that when the reaction becomes materially advanced so that the reaction mixture consists primarily of bis-β-hydroxyethyl terephthalate, there is little methyl alcohol present under the then equilibrium conditions. The vapor pressure of methyl alcohol over this mixture is thus so low that further removal of it in order to obtain complete conversion to bis-β-hydroxyethyl terephthalate or its polymers of low degree of polymerization (DP) is impossible without taking extraordinary measures. To use an excess of ethylene glycol in the feed so as to force the equilibrium in the desired direction suffers from the disadvantage that an equal quantity of unreacted ethylene glycol must be removed with the product from the reactor.

An object of this invention is the provision of a process for driving the equilibrium reaction

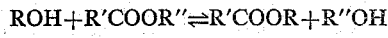

to completion. Another object is to provide a continuous process wherein the reaction of a dihydric alcohol with an ester of a relatively lower-boiling alcohol and a dicarboxylic acid is carried to completion. A further object is to provide a process wherein the reaction of ethylene glycol with dimethyl terephthalate to form primarily bis-β-hydroxyethyl terephthalate or its low DP polymers may be carried out continuously on a commercial scale with essentially quantitative elimination of methyl alcohol. A still further object is to produce a bis-β-hydroxyethyl terephthalate or a low molecular weight polymer thereof having a degree of polymerization of less than 4 on the average in an efficient and economical manner. Other objects will become apparent in the description of the invention and in the claims.

The objects of this invention are accomplished by adjusting a reaction zone in which an alcohol and an ester are made to react to produce a second alcohol more volatile than the first and a second ester so that the ratio of the first alcohol to the sum of the acid radicals in both the first and second esters is substantially constant during the reaction and has a value of at least 3 while continually removing the more volatile alcohol that is produced.

Surprisingly, it has been found that the reaction of ethylene glycol with dimethyl terephthalate to produce bis-β-hydroxyethyl terephthalate or its low DP polymers can be carried out continuously in a rectifying column with an essentially constant ratio of free ethylene glycol to the terephthalic acid radicals in the reflux in the column section below the feed and above the reboiler while simultaneously carrying out the steps of reaction and rectification. The ratio of these materials in the reflux is defined as the ratio of the mols of free ethylene glycol in the overflow from a given plate to the total mols of terephthalic acid radicals in this overflow whether in the form of dimethyl terephthalate, bis-β-hydroxyethyl terephthalate, its low molecular weight polymers or the mixed methyl, hydroxyethyl ester. The ratio of these materials in the reflux may be from 3 to about 30 mols, preferably from 3 to 10 mols of free ethylene glycol for each mol of terephthalic acid radicals. By operating in this range, the presence of the excess free ethylene glycol favorably displaces the equilibrium of the reaction in the desired direction, acts as a carrier for the volatile alcohol produced and provides a large reservoir of available heat for the vaporization of the volatile alcohol. The ratio can be made less but to do so results in a less quantitative elimination of methyl alcohol or a longer reaction time or both. To make the ratio higher than about 30 involves a very high heat load on the column; preferably, for the most efficient utilization of heat in the column, the ratio is maintained below about 10.

Other relatively higher boiling dihydric alcohols may be used in place of ethylene glycol, and other esters of a lower-boiling alcohol and a dicarboxylic acid may be used in place of dimethyl terephthalate to produce desired glycol esters of dicarboxylic acids or their polymers of low degree of polymerization, since the process of the invention is especially adapted to the production of such esters. The invention extends to the use of mixtures of dihydric alcohols, or mixtures of esters of dicarboxylic acids with lower-boiling alcohols, as starting materials for producing mixtures of esters of glycols and dicarboxylic acids, which in turn may be converted into valuable copolyesters.

The invention therefore comprehends a continuous process for reacting a dihydric alcohol starting material comprising at least one relatively higher-boiling dihydric alcohol with an ester starting material comprising at least one ester of a lower-boiling alcohol and a dicarboxylic acid to form an ester product comprising at least one ester of a dihydric alcohol and a dicarboxylic acid, said process comprising the substantial completion of the reaction by feeding in proportion a total of from 1.3 to 3.5 mols of said dihydric alcohol starting material and 1 mol of said ester starting material to a reaction zone containing a transesterification catalyst, withdrawing said ester product so formed at about the same molar rate as said ester starting material is added, removing by distillation the volatile alcohol as it is formed and after equilibrium is set up maintaining at least one dihydric alcohol under reflux so that in the reaction zone the total number of mols of free dihydric alcohol is maintained at a substantially constant ratio in the range of from 3 to 30 times the total number of mols of dicarboxylic radicals present. Preferably, the ratio is maintained at a substantially constant value of from 3 to 10.

In order that the invention may be more readily understood, reference may be had to the drawing which sets forth in schematic form an apparatus type which may be utilized in carrying out the reaction as described. In the following description the reaction between ethylene glycol and dimethyl terephthalate is used to illustrate the process of the invention.

Referring now to the figure, separate streams of the reactants coming through tubes 1 and 2 and preheated to the temperature of the liquid mixture on the feed plate 3 are fed into the upper part of the bubble-cap column 4 so as to have primarily a rectifying section above the feed plate and a reacting and rectifying section below the feed plate with the upper section of the column containing appreciably fewer plates than the lower section. The ethylene glycol and dimethly terephthalate need not be fed to the same plate and in some instances it may be desirable to feed the ethylene glycol onto a plate above the feed plate 3 for the dimethyl terephthalate. The ethylene glycol may be fed to the column cold, i. e., room temperature or above, but for purposes of economy and optimum operation in the column, it is usually desirable to have its temperature approximate the temperature of the feed plate. Similarly, the temperature of the dimethyl terephthalate feed stream may be any reasonable temperature above its melting point, e. g., 145 to 175° C., but here too for the reasons given above, it is usually desirable to have its temperature approximate the temperature on its feed plate. The molar ratio of ethylene glycol to dimethyl terephthalate as fed to the reactor may vary from 1.3 to 3.5 or even more but will preferably be about 1.7 to 2.1.

Superimposed on the column is a partial condenser 5 to control the temperature of the vapor take-off proceeding to the total condenser 6 from which the liquor rich in methyl alcohol proceeds to suitable receivers for use in other processes or for further purification if required.

Before initiating the reaction in the column it is prefilled with ethylene glycol in an amount calculated to give the desired ratio of free ethylene glycol to terephthalic acid radicals. The hold-up in the column is so adjusted, by controlling such factors as the total liquid volume on all the plates, the feed rate of the reactants and the mols of reflux per mol of product, that a minimum of time is required for the reactants to be processed in the column to produce at outlet 7 the desired bis-β-hydroxyethyl terephthalate or a low molecular weight polymer of this material having a DP of 2 to 4. Usually this time is not much greater than 4 hours nor much less than one-half hour. With particularly slow catalysts chosen because of their other favorable characteristics, the time may be somewhat longer than 4 hours, but, preferably, the time that any particular terephthalic acid radical spends in the column will on the average be less than 3 hours. A heating medium, such as p-cymene or a mixture of diphenyl and diphenyl oxide (Dowtherm) is supplied to the heating coil 8 in the reboiler 9 at such a rate as to maintain a reflux having a ratio of free ethylene glycol to the terephthalic acid radicals in the range of 3 to 30; preferably the ratio is maintained in the range 3 to 10, and in a highly preferred embodiment of the invention the ratio is maintined in the range 4 to 7. The preferred operating conditions at atmospheric pressure are further delineated by employing a temperature in the reboiler of 205 to 275° C. and preferably below 240° C. e. g., 230° C., a temperature on the plate above the reboiler of 190° C. to 215° C. and preferably 202° C., a temperature on the feed plate of 140° C. to 200° C. and preferably 175° C. and a temperature in the overhead vapor line of 64.5 to 80° C. and preferably 70° C. Obviously if it is desired to operate at sub-atmospheric pressure these temperatures will fall in a lower range.

To maintain equilibrium conditions the product (calculated as terephthalic acid radicals) is taken out at 7 at the same rate in mols per hour as the dimethyl terephthalate is fed. Likewise, the ratio of ethylene glycol (combined and free) to the terephthalate in the product is maintained the same as that in the feed. When the feed ratio is 2.1 mols ethylene glycol to 1 mol of dimethyl terephthalate and the emerging product is pure bis-β-hydroxyethyl terephthalate, there will be an excess of 0.1 mol of ethylene glycol for each mol of the terephthalate exiting. If the bis-β-hydroxyethyl terephthalate has reacted to form a low molecular weight polymer having a DP of 2, there will be an excess of glycol amounting to 0.6 mol exiting with the product for each mol of dimethyl terephthalate fed to the column. Since the product is to be polymerized into fiber-forming or film-forming polyethylene terephthalate, it is relatively unimportant whether this product is bis-β-hydroxyethyl terephthalate or a low DP polymer of it. Whether the mixture be free ethylene glycol plus bis-β-hydroxyethyl terephthalate or its dimer, trimer, tetramer or the like is determined by the temperature and pressure conditions at the point of product take-off as well as the molar ratio of free ethylene glycol to terephthalic acid radicals at this point.

The following example shows the marked improvement in the conversion of dimethyl terephthalate and ethylene glycol to monomer when operating with an essentially constant ratio of free ethylene glycol to terephthalic acid radicals in the reflux in the column section below the feed and above the reboiler, the desired conversion being achieved when this ratio is three or above.

EXAMPLE 1

The equipment comprised a jacketed 12-plate bubble-cap column section 4 feet 4 inches high with a 12" inside diameter and a 3½ inche plate spacing. This column section was mounted on a jacketed pot type reboiler 14 inches high containing a pancake type heating coil. Mounted on the bubble-cap column section was an insulated packed column section having an inside diameter of 6 inches and a height of 40 inches. This space was filled with stainless steel Raschig rings ½ x ½ x 1/32". The vapor from the packed section passed to a partial condenser and then proceeded to a total condenser. The vapor temperature at the exit from the partial condenser was maintained at 70° C. The condensate from the total condenser flowed to a collector. All the equipment was fabricated from stainless steel.

In operation the bubble-cap column section was prefilled with sufficient ethylene glycol to produce the desired constant ratio of free ethylene glycol to terephthalic acid radicals in the reflux in the column section below the feed and above the reboiler. Molten dimethyl terephthalate at a temperature of 150° C. was fed to the top plate in the bubble-cap column section at a rate of 26.7 pounds per hour. Similarly, fed to this plate at the same temperature and at a rate of 18.0 pounds per hour was the ethylene glycol containing the catalyst for the reaction. This catalyst, in weight percent of the dimethyl terephthalate, consisted of 0.035% zinc acetate, 0.005% lithium hydride and 0.03% antimony oxide ($Sb_2O_3$). The jacket for the bubble-cap column section was supplied with para-cymene vapor at 190° C. The rate of monomer withdrawal from the reboiler together with excess ethylene glycol was 35.9 pounds per hour. The temperature of the monomer in the reboiler was maintained at 230° C. and the Dowtherm heating vapor in the heating coil and in the reboiler jacket was maintained at 265° C.

When operating in this fashion but maintaining a ratio of free ethylene glycol to terephthalic acid radicals below 3 in the reflux in the column section below the feed and above the reboiler, a poor conversion of dimethyl terephthalate to monomer was obtained while above 3 an excellent conversion was obtained as shown in the table below:

*Table*

| Av. ratio [1] in column above reboiler and below feed | Plate below feed plate | | Second plate above reboiler | | Product from reboiler, percent con.[2] |
|---|---|---|---|---|---|
| | Ratio [1] | Percent con.[2] | Ratio [1] | Percent con.[2] | |
| 2.4 | 2.1 | 58 | 2.9 | 78 | 94.3 |
| 4.6 | 4.3 | 58 | 4.8 | 90 | 99.2 |

[1] Molar ratio of free ethylene glycol to terephthalic acid radicals.
[2] Percent conversion of dimethyl terephthalate to bis-β-hydroxyethyl terephthalate or its low DP polymers.

In order to obtain the desired ratio of free ethylene glycol to terephthalic acid radicals in the column section below the feed and above the reboiler the column is prefilled with the calculated amount of ethylene glycol. The feed is then introduced and operation begun. After a relatively short period this ethylene glycol is distributed throughout this section of the column and equilibrium steady state conditions persist from this time on. The effect of prefilling the bubble-cap column section with free ethylene glycol to obtain the desired ratio of free ethylene glycol to terephthalic acid radicals in the column section below the feed plate and above the reboiler can be achieved without introducing free ethylene glycol prior to start up. This is done by introducing the feed stock and operating the column in the initial stages so as to produce a low molecular weight polyethylene terephthalate polymer, boiling up the additional ethylene glycol thus produced and removing the low molecular weight polymer at a rate below the equilibrium rate in the example of 35.9 pounds per hour. Once sufficient ethylene glycol produced by this means has accumulated in the column to give the desired ratio of ethylene glycol to terephthalic acid radicals, the operating conditions of the column are returned to normal and the rate of monomer take-off is maintained at the equilibrium rate of 35.9 pounds per hour as indicated in the example.

It is desirable to add a catalyst to increase the rate of reaction and it is preferred to add this catalyst to one of the feed streams either in the ethylene glycol or in the dimethyl terephthalate, depending on the solubility or dispersibility characteristics of the catalyst in either material. The catalyst may be lead oxide, sodium alcoholate, potassium or beryllium metal or any of the other catalysts disclosed in U. S. 2,465,319. A particularly effective catalyst combination is lithium hydride, zinc acetate and antimony oxide. Other highly effective catalysts are manganous acetate and sodium acetate, which are usually used in combination with antimony oxide.

By employing the apparatus and process described, a product is obtained which has essentially no unreacted dimethyl terephthalate left in it (less than 1.0% and usually less than 0.25%) and hence is particularly valuable for polymerizing into fiber- and film-forming polyethylene terephthalate by any of the known methods as disclosed in such patents as U. S. 2,465,319 and 2,534,028.

Although the process has been described in connection with the drawing as having been carried out in a bubble-cap column, it is obvious from the example that any of the known types of rectifying columns such as a packed column may be employed although smaller or larger columns may be required to provide the proper hold-up in the column and the proper reflux ratios in the column. Combinations of packed columns and bubble-cap columns may be employed, e. g., the use of a packed column section above the feed and a bubble-cap column section below the feed to achieve economies in space, materials of construction or other important considerations. It is likewise to be understood that a total condenser could be used in the place of the partial condenser although this substitution would probably require the addition of an additional plate or plates in the upper section of the bubble-cap column or increasing the length of this section in a packed column. These vessels can be operated at super-atmospheric pressures or sub-atmospheric pressures but preferably for matters of economy in construction and operation it is preferred to operate at atmospheric pressure.

In the process and apparatus described the reactor can consist of only a single stage as described or it can consist of multiple stages. Where multiple stages are employed, the product exiting from the reboiler in the first stage can be fed to the top of another similar such reactor which may be operating at a different reflux ratio and different temperature conditions in order to effect the desired degree of reaction. Alternately, the multiple stages can be combined into a single column, each stage having its own reboiler and each stage maintaining its own particular set of operating temperatures and reflux conditions, depending on the product to be produced. Such stages may have different column diameters, different plate capacities, as well as other differences well known to designers of rectifying equipment so as to provide the desired degree of versatility. A somewhat similar effect may be achieved by inserting partial condensers in the column at various levels so as to maintain a plurality of reaction zones, each having a substantially constant ratio of free ethylene glycol to terephthalic acid radicals. An incompletely insulated column will perform in such a manner.

In place of ethylene glycol, other relatively higher-boiling dihydric alcohols may be used, such as 1,4-butylene glycol, decamethylene glycol, and diethylene glycol. Similarly, in place of dimethyl terephthalate, other esters of lower-boiling alcohols and dicarboxylic acids may be used, such as dibutyl terephthalate, dimethyl isophthalate, diethyl adipate, dimethyl hexahydroterephthalate, and dimethyl sebacate. A mixture of dihydric alcohols may be used, as well as a mixture of esters of dicarboxylic acids and lower-boiling alcohols. If desired, a mixture of dihydric alcohols containing a polyethylene glycol or other relatively non-volatile dihydric alcohols may be used, provided that at least one dihydric alcohol in the mixture may be maintained under reflux. When mixed dihydric alcohols or mixed dicarboxylic esters are used as starting materials, the ratio of free dihydric alcohol to dicarboxylic radicals in the reaction zone is calculated as the ratio of the total mols of free dihydric alcohols to the total mols of dicarboxylic radicals.

EXAMPLE 2

The equipment comprised a 19 plate bubble-cap column section 17 feet 10½ inches high with a 12⅜ inch inside diameter and a 12-inch plate spacing. This column section was mounted on a jacketed pot type reboiler 27 inches high containing three sets of heating coils. Mounted on the bubble-cap column section was an insulated shell and tube condenser, designated a partial condenser, having a shell inside diameter of 6 inches and a height of 9 feet 11 inches. This condenser consisted of seven 1-inch outside diameter tubes within the shell. The vapor from the bubble-cap column section passed through this condenser and was partially condensed after which it proceeded to a total condenser. The vapor temperature at the exit from the partial condenser was maintained at 50°. The condensate from the total condenser flowed to a collector. All equipment was fabricated from stainless steel.

The column was brought to equilibrium over a period of several hours without prefilling it, the reactants being introduced directly into the column. Molten dimethyl terephthalate at a temperature of 150° C. was fed to the thirteenth plate in the bubble-cap column section (the plates being numbered from the bottom) at an equilibrium rate of 27.8 pounds per hour. To the sixteenth plate in the column was fed an equilibrium rate of 21.0 pounds per hour of a mixture maintained at 100° C. containing 89.9% by weight ethylene glycol, 9.9% polyethylene glycol having an average molecular weight of 3350, 0.063% manganous acetate, and 0.090% antimony trioxide. The equilibrium rate of withdrawal of the monomer mixture was 39.6 pounds per hour.

The total pressure drop across the 19 bubble-cap plates was observed to be steady at 70 inches of water with an overhead pressure of 375 mm. of mercury absolute. The temperature profile of the column was observed to be as follows:

| Plate No. | Temp., °C. |
|---|---|
| 1 | 184 |
| 4 | 181 |
| 8 | 178.5 |
| 10 | 178 |
| 13 | 173.5 |
| 15 | 172 |
| 18 | 168 |
| 19 | 100 |

The temperature in the reboiler was maintained at 212° C. and the Dowtherm heating vapor in the reboiler jacket and in the coils was maintained at 245° C.

The ratio of the total mols of free ethylene glycol and polyethylene glycol to the total mols of terephthalate radicals at equilibrium, as shown by analysis of plate samples, was 12.4 at the tenth plate (65.7% conversion) and 16.3 at the fourth plate (85.8% conversion). When the column was operated in this fashion an excellent conversion of dimethyl terephthalate to a mixed monomer derived from ethylene glycol and polyethylene glycol, amounting to 99.8% conversion as indicated by analysis of the product from the reboiler, was obtained.

EXAMPLE 3

The column described in Example 2 was brought to equilibrium over a period of several hours without prefilling it, the reactants being introduced directly into the column. Molten dimethyl terephthalate at a temperature of 150° C. was fed to the thirteenth plate at an aquilibrium rate of 28.6 pounds per hour. To the sixteenth plate in the column was fed an equilibrium rate of 21.6 pounds per hour of a mixture maintained at 100° C. containing 92.2% by weight ethylene glycol, 7.3% dimethyl sodium 5-sulfoisophthalate, 0.44% sodium acetate, 0.028% manganous acetate, and 0.028% antimony trioxide. The equilibrium rate of withdrawal of the monomer mixture was 40.6 pounds per hour.

The vapor temperature at the exit from the partial condenser was maintained at 50° C. The total pressure drop across the 19 bubble-cap plates was observed to be steady at 70 inches of water with an overhead pressure of 375 mm. of mercury absolute. The temperature profile of the column was observed to be as follows:

| Plate No. | Temp., °C. |
|---|---|
| 1 | 184 |
| 4 | 182.5 |
| 8 | 180 |
| 10 | 178 |
| 13 | 172 |
| 15 | 169.5 |
| 18 | 163 |
| 19 | 100 |

The temperature in the reboiler was maintained at 212° C. and the Dowtherm heating vapor in the reboiler jacket and coils was maintained at 245° C.

The ratio of the mols of free ethylene glycol to the total mols of terephthalate and sodium 5-sulfoisophthalate radicals at equilibrium, as shown by analysis of plate samples, was 9.0 at the tenth plate (96.5% conversion) and 10.5 at the fourth plate (99.4% conversion). When the column was operated in this fashion an excellent conversion of dimethyl terephthalate and dimethyl sodium 5-sulfoisophthalate to a mixed monomer derived from ethylene glycol, amounting to 99.99% conversion as indicated by analysis of the product from the reboiler, was obtained.

Any departure which conforms to the principles of this invention is intended to be included within the scope of the claims below.

I claim:

1. In a continuous process for reacting a dihydric alcohol starting material comprising at least one relatively higher-boiling dihydric alcohol with an ester starting material comprising at least one ester of a lower-boiling alcohol and a dicarboxylic acid to form an ester product comprising at least one ester of a dihydric alcohol and a dicarboxylic acid, the improvement which comprises substantially completing the reaction by feeding in proportion from 1.3 to 3.5 mols of said dihydric alcohol starting material and 1 mol of said ester starting material to a reaction zone containing a transesterification catalyst, withdrawing said ester product so formed at about the same molar rate as said ester starting material is added, removing by distillation the volatile alcohol as it is formed and after equilibrium is set up maintaining at least one dihydric alcohol under reflux so that in the reaction zone the total number of mols of free dihydric alcohol is maintained at a substantially constant ratio in the range of from 3 to 30 times the total number of mols of dicarboxylic radicals present.

2. A continuous process for substantially completing an ester interchange which comprises feeding in proportion from 1.3 to 3.5 mols of ethylene glycol and 1 mol of dimethyl terephthalate to a reaction zone containing a transesterification catalyst, withdrawing the glycol ester of terephthalic acid so formed at about the same molar rate as the dimethyl terephthalate is added to the reaction zone, removing the methyl alcohol as it is formed by distillation and, after equilibrium is set up, maintaining the amount of free glycol in the reaction zone under reflux at a substantially constant molar ratio in the range of from 3 to 10 times the amount of combined terephthalic radicals present in both dimethyl terephthalate and ethylene glycol terephthalate.

3. In a continuous process for reacting a relatively higher-boiling dihydric alcohol with an ester of a lower-boiling alcohol and a dicarboxylic acid to form an ester of the dihydric alcohol and the dicarboxylic acid, the improvement which comprises substantially completing the reaction by feeding in proportion from 1.3 to 3.5 mols of the dihydric alcohol and 1 mol of the ester of a lower-boiling alcohol and dicarboxylic acid to a reaction zone containing a transesterification catalyst, withdrawing the ester of the dihydric alcohol and dicarboxylic acid so formed at about the same rate the first-mentioned ester is added, removing the volatile alcohol as it is formed by distillation and after equilibrium is set up maintaining the dihydric alcohol under reflux at a substantially constant value of from 3 to 10 times the mols of combined dicarboxylic radicals present in both esters.

4. The process of claim 1 in which the said relatively higher-boiling dihydric alcohol is ethylene glycol and the said ester starting material is dimethyl terephthalate.

5. The process of claim 1 in which the said dihydric alcohol starting material is a mixture of ethylene glycol and polyethylene glycol.

6. The process of claim 1 in which the said ester starting material contains dimethyl sodium 5-sulfoisophthalate.

No references cited.